(12) United States Patent
Humphrey

(10) Patent No.: US 8,752,790 B2
(45) Date of Patent: Jun. 17, 2014

(54) AIRCRAFT LANDING GEAR STEERING SYSTEM

(75) Inventor: Richard Humphrey, West Midlands (GB)

(73) Assignee: GE Aviation Systems Limited, Cheltenham Gloucestershire (GB)

( * ) Notice: Subject to any disclaimer, the term of this patent is extended or adjusted under 35 U.S.C. 154(b) by 1257 days.

(21) Appl. No.: 12/431,811

(22) Filed: Apr. 29, 2009

(65) Prior Publication Data

US 2009/0294578 A1 Dec. 3, 2009

(30) Foreign Application Priority Data

May 2, 2008 (GB) ................................ 0808087.1

(51) Int. Cl.
*B64C 25/10* (2006.01)

(52) U.S. Cl.
USPC ....................................... 244/102 A

(58) Field of Classification Search
USPC ... 244/100 R, 102 R, 102 A, 102 SL, 102 SS, 244/103 R, 104 R, 104 LS, 103 S, 103 W, 50; 74/640
See application file for complete search history.

(56) References Cited

U.S. PATENT DOCUMENTS

| | | | | |
|---|---|---|---|---|
| 2,460,387 A * | 2/1949 | Hunter | ........................... | 244/50 |
| 2,500,577 A * | 3/1950 | Sands, Jr. | .................. | 244/103 R |
| 2,906,143 A | 9/1959 | Musser | | |
| 3,211,400 A | 10/1965 | Booth | | |
| 3,214,999 A * | 11/1965 | Lapp | ........................... | 74/665 D |
| 3,435,705 A * | 4/1969 | Musser | ........................... | 74/640 |
| 4,102,423 A * | 7/1978 | Reid | ........................... | 180/7.1 |
| 4,449,442 A * | 5/1984 | Ebbing et al. | ...................... | 91/44 |
| 5,643,128 A * | 7/1997 | Kennedy | ....................... | 475/168 |
| 7,178,427 B2 * | 2/2007 | Christensen | .................... | 74/640 |
| 7,975,960 B2 * | 7/2011 | Cox et al. | ......................... | 244/50 |
| 2006/0046889 A1 * | 3/2006 | Christensen | .................... | 475/170 |
| 2006/0078445 A1 * | 4/2006 | Carter et al. | ............... | 417/423.6 |
| 2006/0213320 A1 * | 9/2006 | Menjak et al. | .................... | 74/640 |
| 2007/0119664 A1 | 5/2007 | Perrault et al. | | |
| 2007/0158497 A1 * | 7/2007 | Edelson et al. | ............ | 244/103 S |
| 2007/0209861 A1 * | 9/2007 | Kruttschnitt et al. | .......... | 180/444 |

(Continued)

FOREIGN PATENT DOCUMENTS

| | | |
|---|---|---|
| CN | 2402596 Y | 10/2000 |
| CN | 1974321 A | 6/2007 |

(Continued)

OTHER PUBLICATIONS

Unofficial translation of SIPO Chinese Office Action from corresponding CN Patent Application 200910138825.9 dated Feb. 8, 2013.

(Continued)

*Primary Examiner* — Tien Dinh
*Assistant Examiner* — Keith L Dixon
(74) *Attorney, Agent, or Firm* — Global Patent Operation; Vivek P. Shankam

(57) ABSTRACT

An aircraft landing gear steering system comprising a turning member that is operably coupled to a landing gear leg through a harmonic drive mechanism. The landing gear steering system may be electrically driven. Additionally, the landing gear system has various advantages, including the provision of a safe failure mode should the harmonic drive mechanism fail.

12 Claims, 4 Drawing Sheets

(56) References Cited

U.S. PATENT DOCUMENTS

| | | | |
|---|---|---|---|
| 2007/0241230 A1 | 10/2007 | Bucheton et al. | |
| 2008/0202269 A1* | 8/2008 | Yamakawa | 74/422 |
| 2009/0114765 A1* | 5/2009 | Cox et al. | 244/50 |
| 2010/0038478 A1* | 2/2010 | Knight | 244/102 R |
| 2010/0280716 A1* | 11/2010 | Shah et al. | 701/42 |

FOREIGN PATENT DOCUMENTS

| | | | |
|---|---|---|---|
| EP | 0836990 | | 4/1998 |
| FR | 1334565 | | 8/1963 |
| FR | 2677951 | | 12/1992 |
| GB | 791101 | | 2/1958 |
| GB | 1071474 | | 6/1967 |
| GB | 2161123 | | 1/1986 |
| GB | 2287681 | | 9/1995 |
| GB | 2459714 A | | 11/2009 |
| JP | 2007192248 A | | 8/2007 |
| JP | 2007284054 A | | 11/2007 |
| RU | 510889 | * | 6/1979 |
| RU | 977870 | * | 11/1982 |
| WO | WO9949238 | * | 9/1999 |
| WO | 2005102839 | | 11/2005 |
| WO | 2006071262 | | 7/2006 |
| WO | 2008038037 | | 4/2008 |
| WO | 2007000411 | | 7/2009 |

OTHER PUBLICATIONS

Unofficial translation of SIPO Chinese Search Report from corresponding CN Patent Application 200910138825.9 dated Feb. 8, 2013.

Office Action from JP Application No. 2009-108605 dated Jul. 30, 2013, along with unofficial English translation.

* cited by examiner

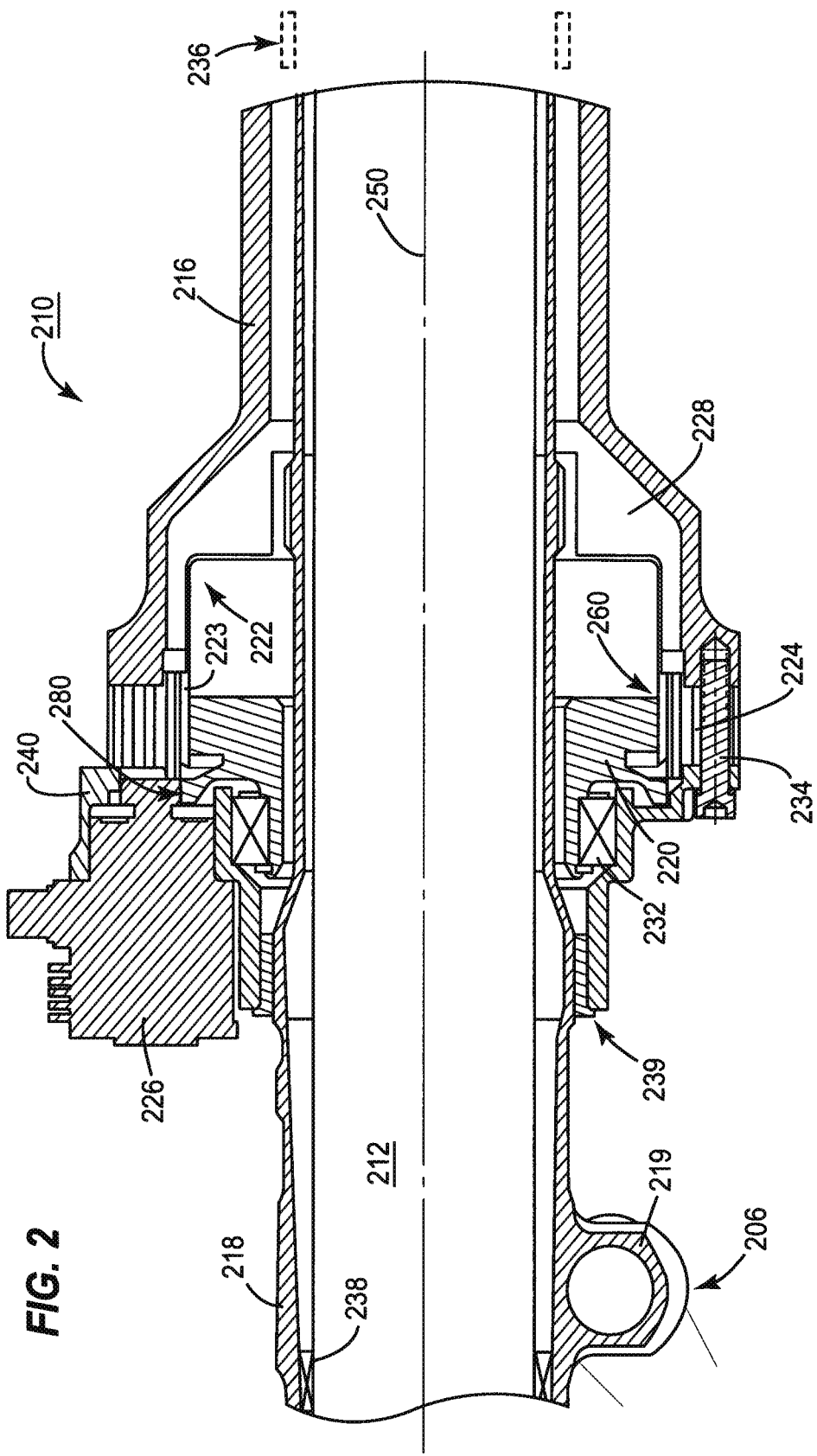

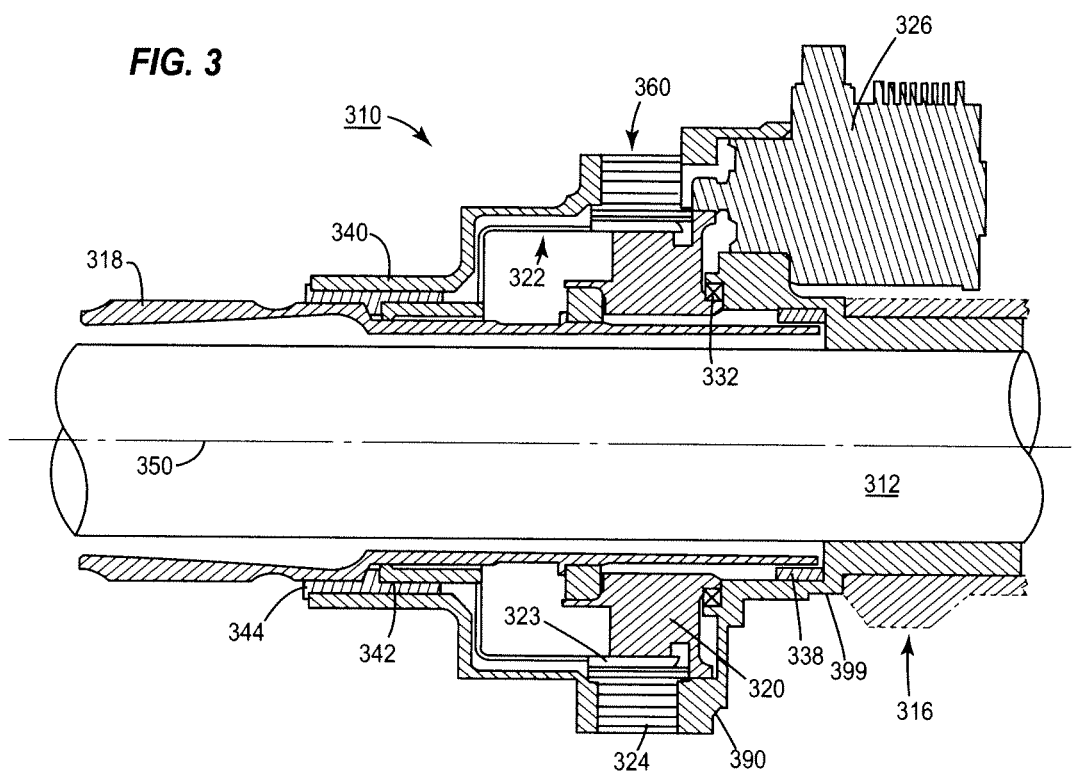

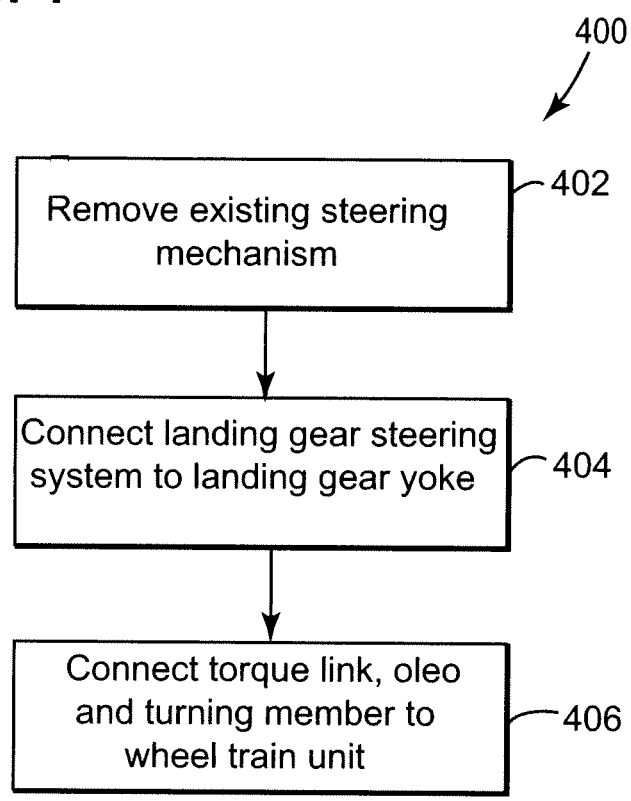

AIRCRAFT LANDING GEAR STEERING SYSTEM

CROSS-REFERENCE TO RELATED APPLICATIONS

This application claims priority under 35 U.S.C. §119(a)-(d) or (f) to prior-filed, co-pending British patent application serial number 0808087.1, filed on May 2, 2008, which is hereby incorporated by reference in its entirety.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

The field of the invention relates generally to aircraft landing gear, and more particularly to improved aircraft landing gear steering systems.

2. Description of Related Art

Most aircraft, and particularly those that are heavier than air, are provided with some type of landing gear. Often such landing gear takes the form of one or more sets of freely rotateable wheels provided on respective wheel train units, which may each be independently retractable into a respective landing gear bay within the fuselage of the aircraft so as to reduce induced drag during flight. Usually, one or more of the wheel train units will also be steerable in order that a pilot can direct the aircraft on the ground. For example, it is fairly common with a tricycle-type undercarriage arrangement that the nose-wheel wheel train unit can be independently rotated relative to the aircraft fuselage in order to steer the aircraft.

Various steering arrangements for aircraft landing gear are known. One common type uses a hydraulically driven mechanical arrangement to steer aircraft [1-7]. However, the hydraulic pipes and actuators needed for such steering arrangements tend to be heavy and bulky, thereby taking up a relatively large amount of space in a landing gear bay. Additionally, hydraulic fluid is used and any leaks from such systems are problematic in the aircraft.

As an alternative to hydraulically driven arrangements, various electrically driven aircraft steering systems have also been developed [8-11]. However, these tend to be used mainly on various light aircraft because they generally have poor mechanical failure characteristics which can, for example, lead to a locking of the steering mechanism should the steering system fail. Such failure modes can be dangerous, and this is one reason why electrical steering systems have not generally been adopted for larger aircraft, such as, for example, those used for commercial air transport applications.

Additionally, certain conventional aircraft landing gear steering systems may also have poor mechanical vibration characteristics. For example, nose wheels of conventional systems can have a tendency to shimmy, or oscillate uncontrollably from side-to-side, when the aircraft touches down. This characteristic is undesirable, and may be reduced for hydraulically driven systems, for example, by providing a hydraulic accumulator and valves to increase hydraulic fluid pressure in the steering system during touch-down. Such a hydraulic accumulator and valves, however, not only add to the weight and complexity of certain conventional aircraft steering systems, but also increase the likelihood that hydraulic fluid leaks will occur.

Various aspects and embodiments of the present invention have therefore been developed whilst bearing the aforementioned disadvantages of conventional aircraft landing gear steering systems in mind.

BRIEF SUMMARY OF THE INVENTION

According to a first aspect of the present invention, there is provided an aircraft landing gear steering system. The aircraft landing gear steering system comprises a turning member that is operably coupled to a landing gear leg through a harmonic drive mechanism.

According to a second aspect of the present invention, there is provided a method of providing an aircraft steering system. The method comprises coupling a turning member to a landing gear leg through a harmonic drive mechanism. The method may also, advantageously, be used to retrofit various embodiments of the present invention to conventional aircraft landing gear mechanisms.

By using a harmonic drive mechanism to couple a landing gear leg to a turning member, a lightweight compact steering system can be provided. Moreover, use of a harmonic drive mechanism also enables a high gearing ratio to be provided between an actuator and the turning member, thus enabling relatively low torque actuators to be used.

For example, in various embodiments of the present invention an electric motor module may be used, which in turn enables an even more compact steering device to be provided with the added benefit of being able to reduce or even eliminate the need for the provision of hydraulic actuation systems in a landing gear bay.

BRIEF DESCRIPTION OF THE DRAWINGS

Various aspects and embodiments of the present invention will now be described in connection with the accompanying drawings, in which:

FIG. 2 shows a cross-section through an aircraft landing gear steering system according to an embodiment of the present invention;

FIG. 3 shows a cross-section through an aircraft landing gear steering system according to a further embodiment of the present invention; and FIG. 4 shows a method of retrofitting an aircraft landing gear steering system according to an embodiment of the present invention.

DETAILED DESCRIPTION OF THE INVENTION

Figure 1:
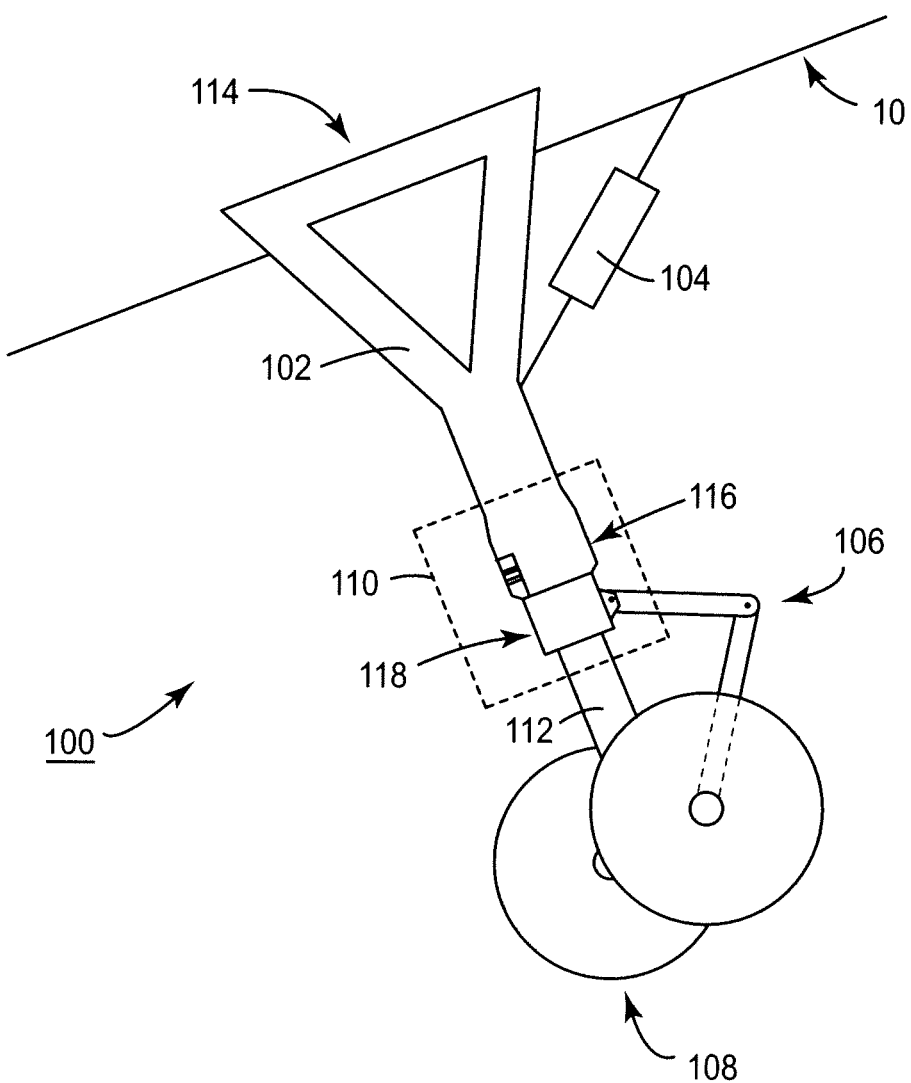
FIG. 1 shows a schematic diagram of aircraft landing gear according to an embodiment of the present invention.

FIG. 1 shows schematically a diagram of aircraft landing gear 100 according to an embodiment of the present invention. The aircraft landing gear 100 is retractable into a landing gear bay (not shown) provided in the fuselage 10 of an aircraft. A retraction/extension mechanism 104 is provided to move the landing gear 100 into and out of the landing gear bay.

The landing gear 100 comprises a landing gear yoke 102 that is pivotally mounted at a first end 114 within the landing gear bay. The landing gear 100 also comprises a wheel train unit 108 connected to a shock absorbing oleo 112 and a torque link 106. The oleo 112 and the torque link 106 are connected to a leg portion 116 provided at a second end of the landing gear yoke 102, distal the first end 114 thereof, via a landing gear steering system 110.

The landing gear steering system 110 comprises a turning member 118 coupled to an internal harmonic drive mechanism (for examples, see FIGS. 2 and 3, below) that is additionally coupled to the leg portion 116. The torque link 106, in this example, is connected to the turning member 118, and the oleo 112 passes concentrically through the turning member 118.

FIG. 2 shows a cross-section through part of an aircraft landing gear steering system 210 according to an embodiment of the present invention. The steering system 210 includes a tube-like turning member 218 having an oleo 212 mounted concentrically therein in alignment with a central axis 250 by way of bearings 238. The turning member 218 projects through the centre of a harmonic drive mechanism 260, described in more detail below. Additionally, the turning member 218 comprises a projecting lug 219 for coupling to a torque link 206 that is attachable to a wheel train unit (not shown).

A concentrically mounted casing 240 surrounds and is connected to the turning member 218 by way of a connector mechanism 234. An electric motor module 226 is mounted to the casing 240, aligned by shape and fit and retained in place by four screws. The motor provided within the electric motor module 226 is a brushless DC motor, and the electric motor module 226 additionally has a tooth clutch provided at the output.

The casing 240 additionally retains a bearing 232 that supports a wave generator 220 in concentric relationship with the turning member 218. The wave generator 220 is thus able to rotate with respect to the turning member 218. The wave generator 220 has an elliptical profile when viewed in a plane perpendicular to the central axis 250, and is made of a metal material, such as steel. The electric motor module 226 is also coupled to the wave generator 220 by way of an intermeshing reciprocal toothed arrangement, such that activation of the electric motor module 226 causes the wave generator 220 to rotate about the central axis 250 and the turning member 218.

The steering system 210 includes a landing gear leg 216. This leg may be connected to or formed as an integral part of a landing gear yoke, for example. Differential rotational movement between the landing gear leg 216 and the turning member 218 enables controlled steering of a wheel train unit coupled to the turning member, and thus of an aircraft.

The landing gear leg 216 comprises a flex spline housing 228 and supports (distal) bearings 236 that in turn support the turning member 218 therein, thereby maintaining the turning member 218 and the landing gear leg 216 in concentric relationship. A flex spline 222 is provided within the flex spline housing 228 and is able to rotate therein relative to the flex spline housing 228 and landing gear leg 216. Additionally, a drive spline 239 is also provided to support the flex spline 222 and to maintain it in concentric relationship with respect to the landing gear leg 216.

The flex spline 222 is cup-shaped and can be made of relatively thin walled material, such as, for example, steel material. Additionally, the flex spline 222 includes a set of N teeth 223 provided externally about its periphery.

A fixed spline 224 is fixed to a first end of the landing gear leg 216. The fixed spline 224 is ring-shaped and comprises a set of N+Δ internal teeth provided on an internal circumferential surface thereof. The fixed spline 224 is concentric with the wave generator 220 and the flex spline 222. Additionally, the internal teeth of the fixed spline 224 intermesh with the external teeth 223 of the flex spline 222.

Together the wave generator 220, the flex spline 222 and the fixed spline 224 form the harmonic drive mechanism 260. The harmonic drive mechanism 260, sometimes referred to as a strain wave gear, provides a gearing ratio from the output of the electric motor module 226 to the landing gear leg 216. This ratio can be made high; see, for example, the explanation of Musser [12] for more detail.

In one example embodiment of the invention the harmonic drive mechanism 260 provides a gearing ratio of 160:1. In this embodiment, an additional gear mechanism 280 is provided at the output of the electric motor module 226 and its output used for driving the harmonic drive mechanism 260. For example, the gear mechanism 280 can have a gearing ratio of 13:1 which when combined with a harmonic drive gear ratio of 160:1 can be used to provide a 75 kNm torque at the turning member 218, for rotating the turning member 218 and the wheel train unit connected thereto, using an electric motor having a relatively low 4 Nm output torque.

One further advantage of these, and various related embodiments of the present invention, lies in the failure mode should the harmonic drive mechanism break. The Applicant has found that one common failure mode for such harmonic drive mechanisms, should they fail at all, is with splitting of the relatively thin walled cup-shaped flex spline, which breaks in an analogous manner to a plastic drinks cup when crushed. However, should this happen for various embodiments of the present invention, the landing gear steering system fails in a free-castor mode in which the turning member is free to rotate relative to the landing gear leg. This, however, is an inherently safe failure mode in which an aircraft can be safely landed and still be steered on the ground by use of differential braking and/or asymmetric power application (for multi-engine aircraft).

FIG. 3 shows a cross-section through an aircraft landing gear steering system 310 according to a further embodiment of the present invention. The aircraft landing gear steering system 310 is packaged as an assembly that is easily removable from a landing gear leg 316.

The steering system 310 includes a tube-like turning member 318 having an oleo 312 mounted concentrically therein, in alignment with a central axis 350, by way of bearings 338 and 344. The turning member 318 projects through the centre of a harmonic drive mechanism 360, that is described in more detail below. The turning member 318 can be attached to a wheel train unit (not shown) and/or support a projecting lug (not shown), as desired.

A concentrically mounted support 340 surrounds and is connected to the turning member 318 by way of the bearing 344 that abuts both a shoulder portion provided circumferentially about the turning member 318 and a flex spline bearing 342. The bearing 344 is fixed to the support 340. The support 340 is also connected to a fixed spline 324 that forms part of the harmonic drive mechanism 360. The fixed spline 324 is ring-shaped and comprises a set of M+Δ internal teeth provided on an internal circumferential surface thereof.

The steering system 310 also comprises a casing 390 that can be releasably coupled to the landing gear leg 316 at joint 399. The joint 399 may, for example, include one or more of bolts, rivets, screws or the like, permitting the steering system 310 to be quickly and easily released from the landing gear leg 316.

An electric motor module 326 is coupled to the casing 390. The casing 390 also retains a bearing 332 that supports a wave generator 320 disposed in concentric relationship with the turning member 318. The wave generator 320 is thus able to rotate with respect to the turning member 318. The wave generator 320 has an elliptical profile when viewed in a plane perpendicular to the central axis 350. The electric motor module 326 is also coupled to the wave generator 320 by way of an intermeshing reciprocal toothed arrangement, such that activation of the electric motor module 326 is able to cause the wave generator 320 to rotate about the central axis 350 and the turning member 318.

The support 340 additionally provides a housing for a flex spline 322 that is retained therein by the flex spline bearing 342. The flex spline bearing 342 ensures that the flex spline 322 maintains a concentric relationship with the principal central axis 350. The flex spline 322 is also able to rotate relative to both the support 340 and the turning member 318.

The flex spline 322 is cup-shaped and can be made of relatively thin walled material, such as, for example, a stainless steel material. Additionally, the flex spline 322 includes a set of M teeth 323 provided externally about its periphery.

The fixed spline 324 is concentrically mounted with respect to the wave generator 320 and the flex spline 322. Further, the internal teeth of the fixed spline 324 intermesh with the external teeth 323 of the flex spline 322. Together the wave generator 320, the flex spline 322 and the fixed spline 324 form the harmonic drive mechanism 360 that is operable to rotate the landing gear leg 316 with respect to the turning member 318 when the electric motor module 326 is driven with its clutch mechanism engaged.

Again, this embodiment provides the substantial advantage that should the harmonic drive mechanism fail, the inherently safe free-castor mode is the likely outcome.

FIG. 4 shows a method 400 of retrofitting an aircraft landing gear steering system according to an embodiment of the present invention. The method 400 may be used, for example, to replace conventional aircraft steering mechanisms with various of the embodiments described herein, and thereby to enable the removal of certain hydraulic systems from the landing gear bay of those aircraft as well as providing for improved safety in the event of any steering system failures that might occur.

The method 400 comprises the step of removing 402 the existing steering mechanism from a conventional aircraft, for example, by cutting, unbolting, it etc., from a landing gear yoke. Removal of conventional hydraulic actuators, piping, accumulators, etc. from the landing gear bay may also be performed at this time.

Next a step of connecting 404 a landing gear steering system according to an embodiment of the present invention is performed. The landing gear steering system is connected in place of the conventional steering system and may be coupled to a landing gear yoke. For example, the landing gear steering system may be connected by welding, bolting, brazing, riveting, etc., various parts of an existing landing gear yoke to a portion of the landing gear steering system, such as a landing gear leg thereof.

In various embodiments, a casing housing a harmonic drive mechanism is connected to either a turning member or the landing gear leg. A fixed spline of the harmonic drive mechanism may then be physically secured to the landing gear leg, an intermediate support, or the turning member, as appropriate.

Additionally during this phase, various electrical connections may be made, for example, to an electric motor module of the landing gear steering system in order that it can be supplied with power. Other connections can be made, such as those for providing control signals for controlling a motor and/or various clutch mechanisms or the like provided within the landing gear steering system.

Finally, the step of connecting 406 the torque link, oleo and turning member of the landing gear steering system to a wheel train unit is performed. The torque link may be connected in a conventional manner, as may be the oleo once it has been guided through the turning member into a landing gear leg of the new landing gear steering system.

Whilst various embodiments of the present invention have been described in connection with a concentrically mounted harmonic drive mechanism having a radially innermost wave generator coupled to a radially outermost fixed spline by way of an intervening flex spline, those skilled in the art will realise that other configurations for harmonic drive mechanisms are possible, and accordingly that the present invention is not limited solely to the embodiments described herein in detail. For example, a harmonic drive mechanism may be configured such that a wave generator is provided as a radially outermost component.

Moreover, although certain embodiments of the present invention are configured such that a turning member extends through the centre of a harmonic drive mechanism, those skilled in the art will realise that various alternative configurations would also be possible.

Additionally, or alternatively, one or more electric motors or electric motor modules may be used to drive a harmonic drive mechanism. For example, two independently operable electric motor modules may be provided to further improve operational safety and reliability by providing equipment redundancy.

In certain embodiments, a wave generator, a flex spline and a fixed spline may form a harmonic drive mechanism that is operable to drive a landing gear leg directly (e.g. without the essential need to provide additional intervening gear/transmission/clutch/etc. mechanisms, although these can be provided optionally in various alternative embodiments).

Various embodiments of the present invention may also be designed such that the centre of gravity of a wheel train unit lies aftwards of a landing gear steering system, such that should the latter fail the wheel train unit will naturally align with the direction in which the aircraft is travelling so that, for example, upon touch-down the wheels are substantially in an optimal landing configuration.

Furthermore, various embodiments of the present invention may be made by customising commercially available harmonic drive components, such as, for example, certain of those commercially available from Harmonic Drive AG of Limburg, Germany (http://www.harmonicdrive.de).

One or more harmonic drive components may, for example, be concentrically mounted and/or circumferentially configured about the principal axis of rotation of a landing gear steering system. Certain embodiments may also, or alternatively, be provided with a clutch mechanism for disengaging the turning member from the landing gear leg, so as to enable the harmonic drive mechanism to be disconnected in order that an aircraft may be towed, pushed-back, etc.

Therefore, whilst the present invention has been described in accordance with various aspects and preferred embodiments, it is to be understood that the scope of the invention is not considered to be limited solely thereto and that it is the Applicant's intention that all variants and equivalents thereof also fall within the scope of the appended claims.

The invention claimed is:

1. An aircraft landing gear steering system, comprising:
a turning member concentrically mounted via a harmonic drive mechanism to a landing gear leg, wherein the landing gear leg or the turning member projects at least partially through or lies within the harmonic drive mechanism such that should the harmonic drive mechanism break, the landing gear system fails in a free-castor mode in which the turning member is free to rotate relative to the landing gear leg.

2. The aircraft landing gear steering system of claim 1, further comprising:
an electric motor module for driving the harmonic drive mechanism in order to create a relative rotational motion between the landing gear leg and the turning member.

3. The aircraft landing gear steering system of claim 1, further comprising:
a clutch mechanism for disengaging the turning member from the landing gear leg.

4. The aircraft landing gear steering system of claim 1, further comprising;
a gear mechanism for driving the harmonic drive mechanism.

5. The aircraft landing gear steering system of claim 1, wherein the harmonic drive mechanism is operable to drive the landing gear leg directly.

6. The aircraft landing gear steering system of claim 1, wherein the harmonic drive mechanism includes a fixed spline coupled to the landing gear leg or the turning member, the fixed spline being operably connected to a flex spline, and wherein the flex spline is operable to be driven by a wave generator coupled to an actuator.

7. The aircraft landing gear steering system of claim 1, wherein the harmonic drive mechanism includes a fixed spline coupled to the landing gear leg or the turning member, the fixed spline being operably connected to a flex spline, and wherein the flex spline is driven by a wave generator coupled to an actuator when the actuator is operated.

8. A method comprising:
concentrically coupling a turning member to a landing gear leg via a harmonic drive mechanism, wherein the landing gear leg or the turning member projects through or is located within the harmonic drive mechanism.

9. The method of claim 8, further comprising:
providing an electric motor module for driving the harmonic drive mechanism such that activation of the electric motor module induces a relative rotational motion between the landing gear leg and the turning member.

10. The method of claim 8, further comprising:
providing a clutch mechanism for disengaging the turning member from the landing gear leg when tile clutch mechanism is operated.

11. The method of claim 8, further comprising:
providing a gear mechanism, for driving the harmonic drive mechanism.

12. The method of claim 8, wherein activation of the harmonic drive mechanism drives the landing gear leg directly.

* * * * *